US012246351B2

(12) United States Patent
Pringle et al.

(10) Patent No.: US 12,246,351 B2
(45) Date of Patent: Mar. 11, 2025

(54) SCREEN ARRANGEMENT

(71) Applicant: AURY AUSTRALIA PTY LTD., Rutherford (AU)

(72) Inventors: Bradley William Pringle, Rutherford (AU); Noel James Eather, Rutherford (AU)

(73) Assignee: AURY AUSTRALIA PTY LTD., New South Wales (AU)

( * ) Notice: Subject to any disclaimer, the term of this patent is extended or adjusted under 35 U.S.C. 154(b) by 110 days.

(21) Appl. No.: 18/041,808

(22) PCT Filed: Aug. 15, 2021

(86) PCT No.: PCT/AU2021/050901
§ 371 (c)(1),
(2) Date: Feb. 16, 2023

(87) PCT Pub. No.: WO2022/036392
PCT Pub. Date: Feb. 24, 2022

(65) Prior Publication Data
US 2023/0311164 A1     Oct. 5, 2023

(30) Foreign Application Priority Data
Aug. 18, 2020   (AU) ................................ 2020902933

(51) Int. Cl.
*B07B 1/46*     (2006.01)
*F16B 19/10*    (2006.01)

(52) U.S. Cl.
CPC ........ *B07B 1/4645* (2013.01); *F16B 19/1081* (2013.01); *B07B 2201/02* (2013.01)

(58) Field of Classification Search
CPC ..... B07B 2201/02; B07B 1/46; B07B 1/4645; F16B 19/1081

(Continued)

(56) References Cited

U.S. PATENT DOCUMENTS

| 4,909,929 A * | 3/1990 | Tabor | B01D 29/445 209/400 |
| 6,206,200 B1 * | 3/2001 | Gilles | B07B 1/4645 209/400 |

(Continued)

FOREIGN PATENT DOCUMENTS

| CA | 2003733 | * | 5/1990 |
| CA | 2003733 A1 | * | 5/1990 |

(Continued)

OTHER PUBLICATIONS

International Search Report in PCT/AU2021/050901 mailed on Oct. 25, 2021, 6 pages.

(Continued)

*Primary Examiner* — Terrell H Matthews
(74) *Attorney, Agent, or Firm* — Metis IP LLC

(57) ABSTRACT

A screen arrangement (10) including a stringer (16), a securing arrangement (18), and a plurality of screen panels (20) adapted to couple to the stringer (16) by the securing arrangement (18). The plurality of screen panels (20) may each include a side notch (22) arranged to define a screen aperture (24) between adjacent ones of the plurality of screen panels (20) and the stringer (16) includes a stringer aperture (26) aligned with the screen aperture (24). The securing arrangement (18) may include an expandable part (28) adapted to extend from the screen aperture (24) into the stringer aperture (26) and a fastener (30) adapted pass between the screen aperture (24) and the stringer aperture (26) so as to expand the expandable part (28) within the stringer aperture (26). A related method is also disclosed.

19 Claims, 18 Drawing Sheets

(58) Field of Classification Search
USPC .......................................................... 209/405
See application file for complete search history.

(56) References Cited

U.S. PATENT DOCUMENTS

| | | | | |
|---|---|---|---|---|
| 7,717,269 | B2* | 5/2010 | Bacho | B07B 1/46 |
| | | | | 209/405 |
| 9,795,992 | B2* | 10/2017 | Woodgate | F16B 5/0032 |
| 10,953,438 | B2* | 3/2021 | Persson | F16B 23/0061 |

FOREIGN PATENT DOCUMENTS

| | | | | | |
|---|---|---|---|---|---|
| GB | | 2252127 A | * | 7/1992 | ........... B07B 1/4645 |
| WO | WO-2022036392 A1 | * | 2/2022 | ........... B07B 1/4645 |

OTHER PUBLICATIONS

Written Opinion in PCT/AU2021/050901 mailed on Oct. 25, 2021, 8 pages.

* cited by examiner

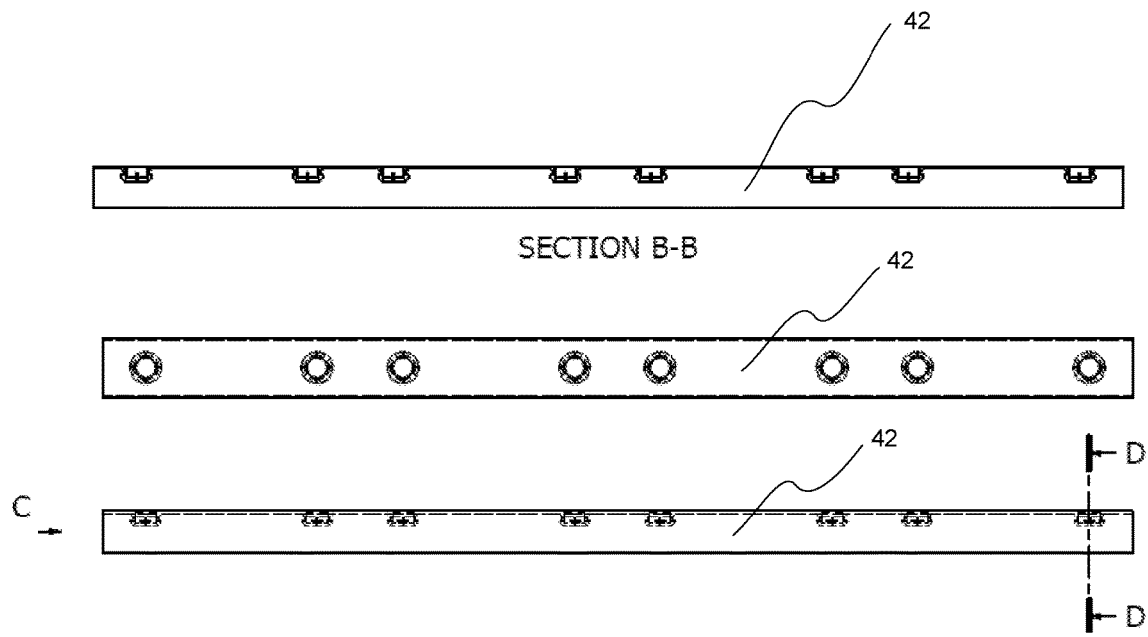
Figures 13a, 13b and 13c
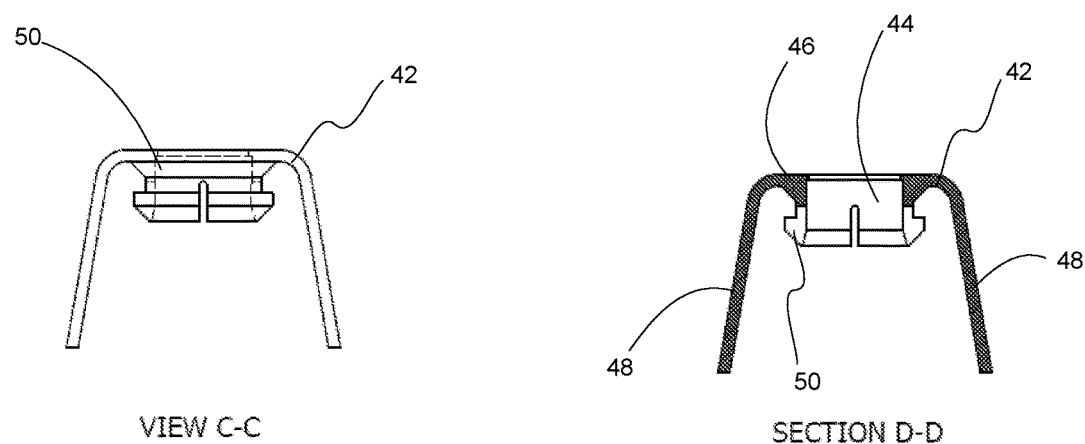
Figure 14
Figure 15

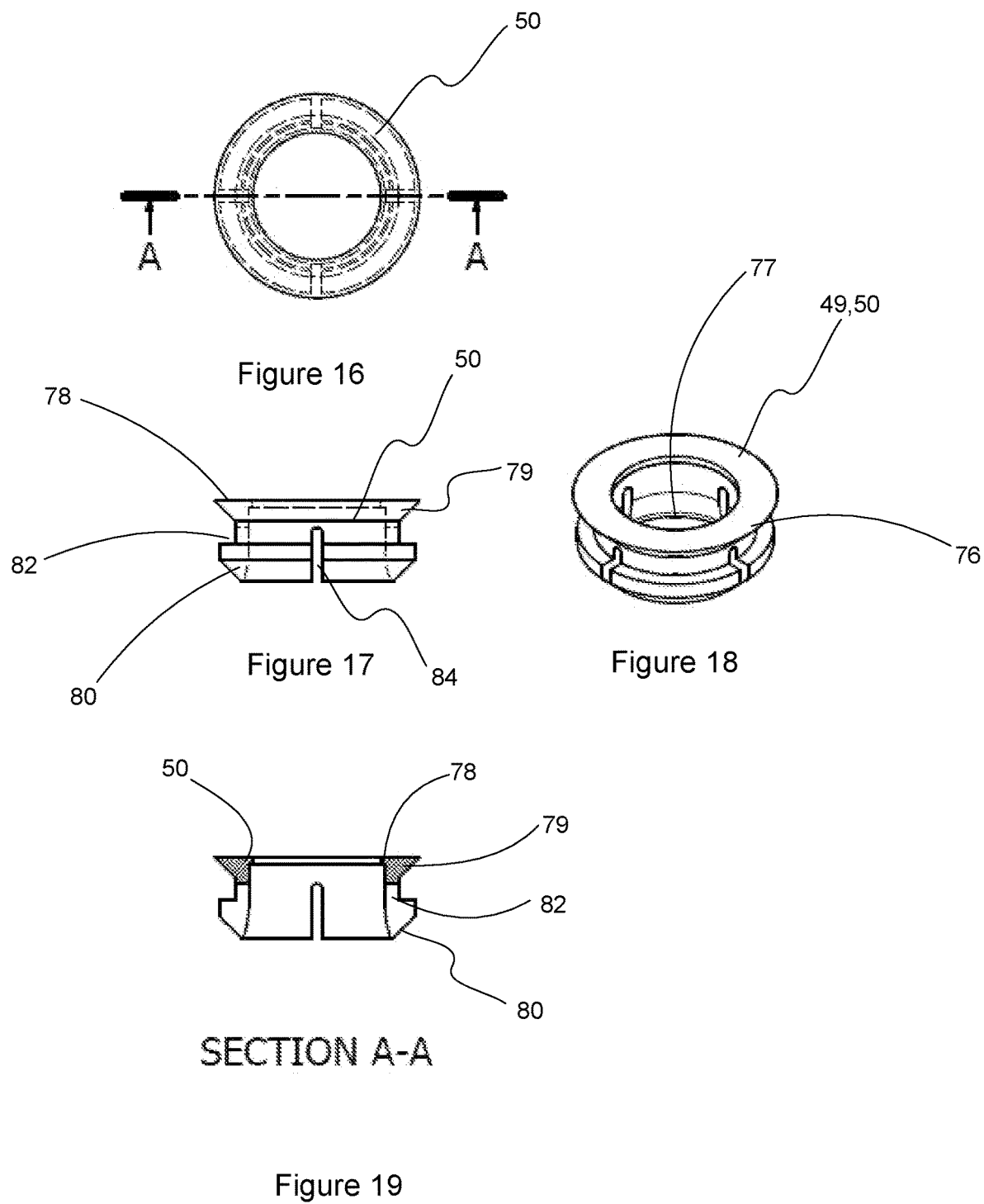

SCREEN ARRANGEMENT

RELATED APPLICATIONS

This application is a U.S. national stage under 35 U.S.C. § 371 of International Application No. PCT/AU2021/050901, filed on 15 Aug. 2021, which claims priority from Australian provisional patent application no. 2020902933 filed on 18 Aug. 2020, the contents of which are incorporated by reference.

TECHNICAL FIELD

The invention relates to a screen arrangement and a method of forming a screen arrangement. In particular, the invention relates to a screen arrangement for minerals processing or the like.

BACKGROUND

Screen arrangements including static and vibrating screens are used in various types of minerals processing to sort or grade material. Such screen arrangements include a screening section including a plurality of apertures through which material may pass and a frame that supports the screening section. The screening section may include one or more screen panels that may be replaceable once worn or damaged.

Problems with existing screen arrangements include, but are not limited to, the manner, ease and robustness of how the screening section, in particular the screen panels, are coupled to the frame. Further problems relate to how the frame and/or screening section are formed to facilitate the coupling between the screening section and frame.

The invention herein seeks to overcome one or more of the above identified problems or at least provide a useful alternative.

SUMMARY

In accordance with a first broad aspect there is provided, a screen arrangement including a stringer, a securing arrangement, and a plurality of screen panels adapted to couple to the stringer by the securing arrangement, wherein the plurality of screen panels each include a side notch arranged to define a screen aperture between adjacent ones of the plurality of screen panels and the stringer includes a stringer aperture aligned with the screen aperture, wherein the securing arrangement includes an expandable part adapted to extend from the screen aperture into the stringer aperture and a fastener adapted pass between the screen aperture and the stringer aperture so as to expand the expandable part within the stringer aperture.

In one aspect, the expandable part is provided in the form of a sleeve having a first section adapted to engage with a ledge of the screen aperture and a second section adapted to be expandable by the fastener.

In another aspect, the sleeve is removeable.

In yet another aspect, the stringer aperture is fitted with a ferrule, preferably a push fit or snap fit ferrule.

In yet another aspect, the panels include part ferrules extending about the notches that form the ferrule between adjacent ones of the plurality of screen panels.

In yet another aspect, the screen arrangement further includes a stringer cap extending between stringer and the adjacent ones of the plurality of screen panels.

In yet another aspect, the stringer cap includes a middle section arranged to be fitted between the stringer and the adjacent ones of the plurality of screen panels, and wings.

In yet another aspect, the wings are flared in a direction away from the adjacent ones of the plurality of screen panels.

In yet another aspect, the stringer cap includes a cap aperture arranged to align with the stringer aperture.

In yet another aspect, the stringer cap includes an integral ferrules extending about the cap aperture and receivable by the stringer aperture.

In yet another aspect, the fastener includes a head adapted to be captured within the screen aperture and a stem extending from the neck, the stem including an expander section adapted to engage with the expandable part.

In yet another aspect, the stringer includes an elongate plate body having a cut out therein and a perpendicular support plate extending across the cut out, the support plate having the stringer aperture therein.

In yet another aspect, the cut out is shaped to provide clearance between the elongate plate body and the stringer aperture.

In yet another aspect, the perpendicular support plate includes a plurality of sections each including one or more of the stringer apertures.

In yet another aspect, each of the plurality of screen panels include a plurality of the notches that form a corresponding plurality of the screen apertures, and wherein the stringer includes a plurality of stringer apertures.

In accordance with a second broad aspect there is provided, a method of securing a plurality of screen panels to a stringer using a securing arrangement, the method including: providing a stringer having a stringer aperture; fitting at least two of the plurality of screen panels adjacent one another such that notches at sides thereof define a screen aperture aligned with the stringer aperture; fitting a fastener through the screen aperture and the stringer aperture so as to expand an expandable part that extends from the screen aperture into the stringer aperture thereby coupling the at least two of the plurality of screen panels and the stringer.

In accordance with a third broad aspect there is provided, a stringer arrangement for a screen arrangement, the stringer arrangement including a stringer having an elongate plate body with a plurality of cut outs along a side thereof and one or more support plates arranged perpendicularly to the elongate plate body and along the side to as to extend across the cut outs, wherein the one or more support plates each include one or more stringer apertures each associated with one or more of the plurality of cut outs.

In an aspect, the elongate plate body and the one or more support plates are adapted to locate with one another.

In another aspect, the elongate plate body includes projections adapted to locate with locating apertures of the one or more support plates.

In yet another aspect, each of the one or more stringer apertures is fitted with a ferrule.

In yet another aspect, the stringer arrangement includes a stringer cap with a middle section arranged to be fitted over the one or more support plates and wings extending from the middle section, the wings being angled to deflect material away from the elongate plate body.

In accordance with a fourth broad aspect there is provided, a method of forming a stringer for a screen arrangement, the method including: forming a plurality of cut outs along a side of an elongate plate body; forming one or more support plates arranged to be located across the cut outs, and forming one or more stringer apertures in the one or more support plates so as to be each associated with one or more of the plurality of cut outs; and joining the one or more support plates with the side of an elongate plate body with the one or more support plates being perpendicular to the elongate plate body.

BRIEF DESCRIPTION OF THE FIGURES

The invention is described, by way of non-limiting example only, by reference to the accompanying figures, in which;

FIGS. 13a, 13b and 13c are side, top and hidden detail views illustrating an example of a stringer cap;

FIGS. 14 is an end view illustrating the cap along section C-C;

FIG. 15 is an end section view illustrating the cap along section D-D;

FIG. 16 is a top hidden detail view illustrating a ferrule;

FIG. 17 is a side hidden detail view illustrating the ferrule;

FIG. 18 is a perspective hidden detail view illustrating the ferrule;

FIG. 19 is a side sectional view illustrating the ferrule;

FIG. 33b is a detailed view illustrating an aperture of the panel as shown in FIG. 33a; and FIG. 33c is a top view illustrating the panel as shown in FIG. 33a.

DETAILED DESCRIPTION

Referring to FIGS. 1 to 33c there are shown examples of a screen arrangement 10 for screening a material in minerals processing or the like. The screen arrangement 10 may form part of a larger process assembly (not shown) for the processing of the material. The examples of the screen arrangements 10 are largely similar and as such like numerals denote like parts. Initially, below, a first example of the screen arrangement 10 is described with reference to FIGS. 1 to 3, and then the various further examples are described highlighting differences of the further examples in comparison to the first example.

Figure 1:
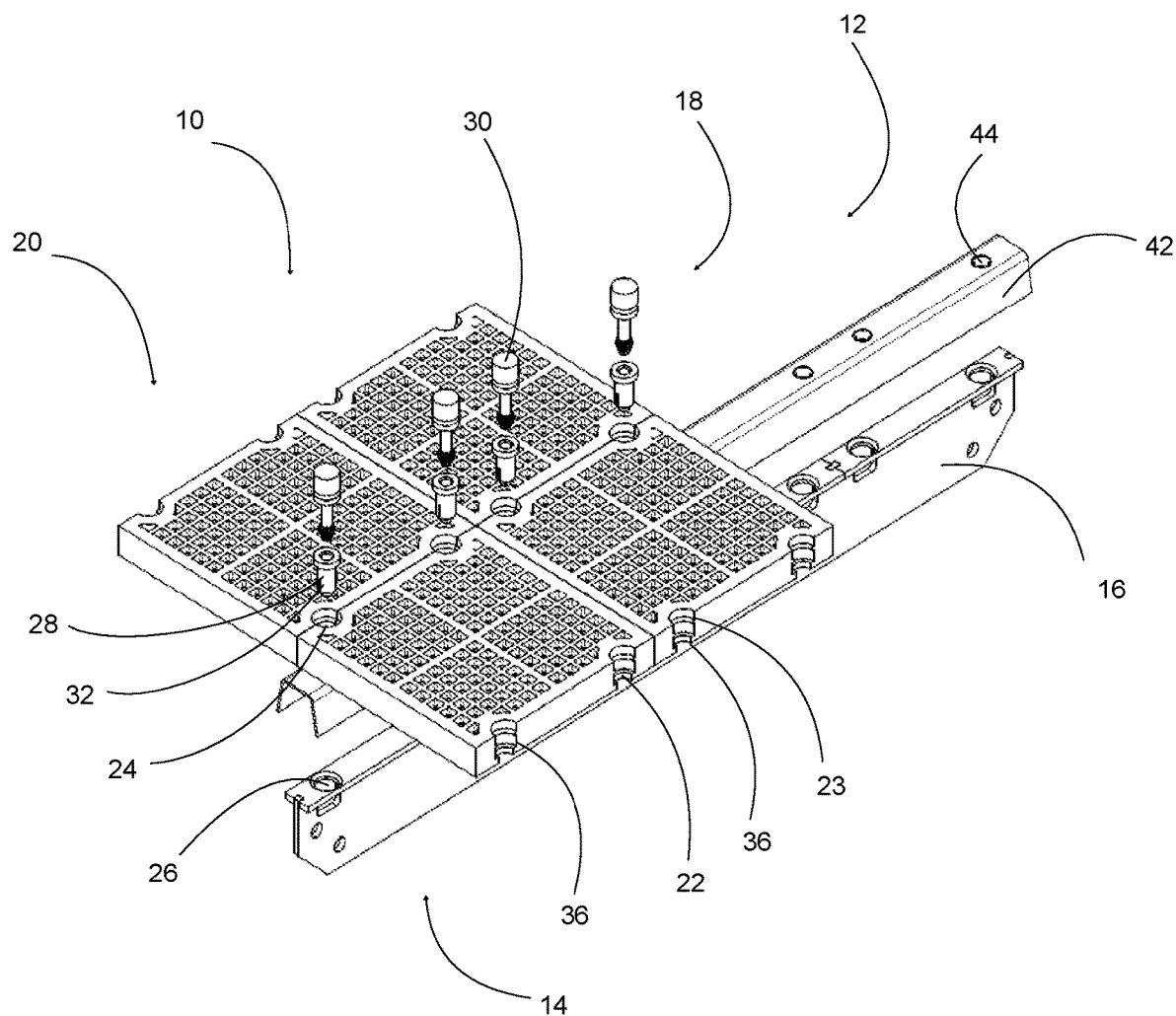
FIG. 1 is a top side exploded parts perspective view illustrating a first example of a screen arrangement.
Figure 2:
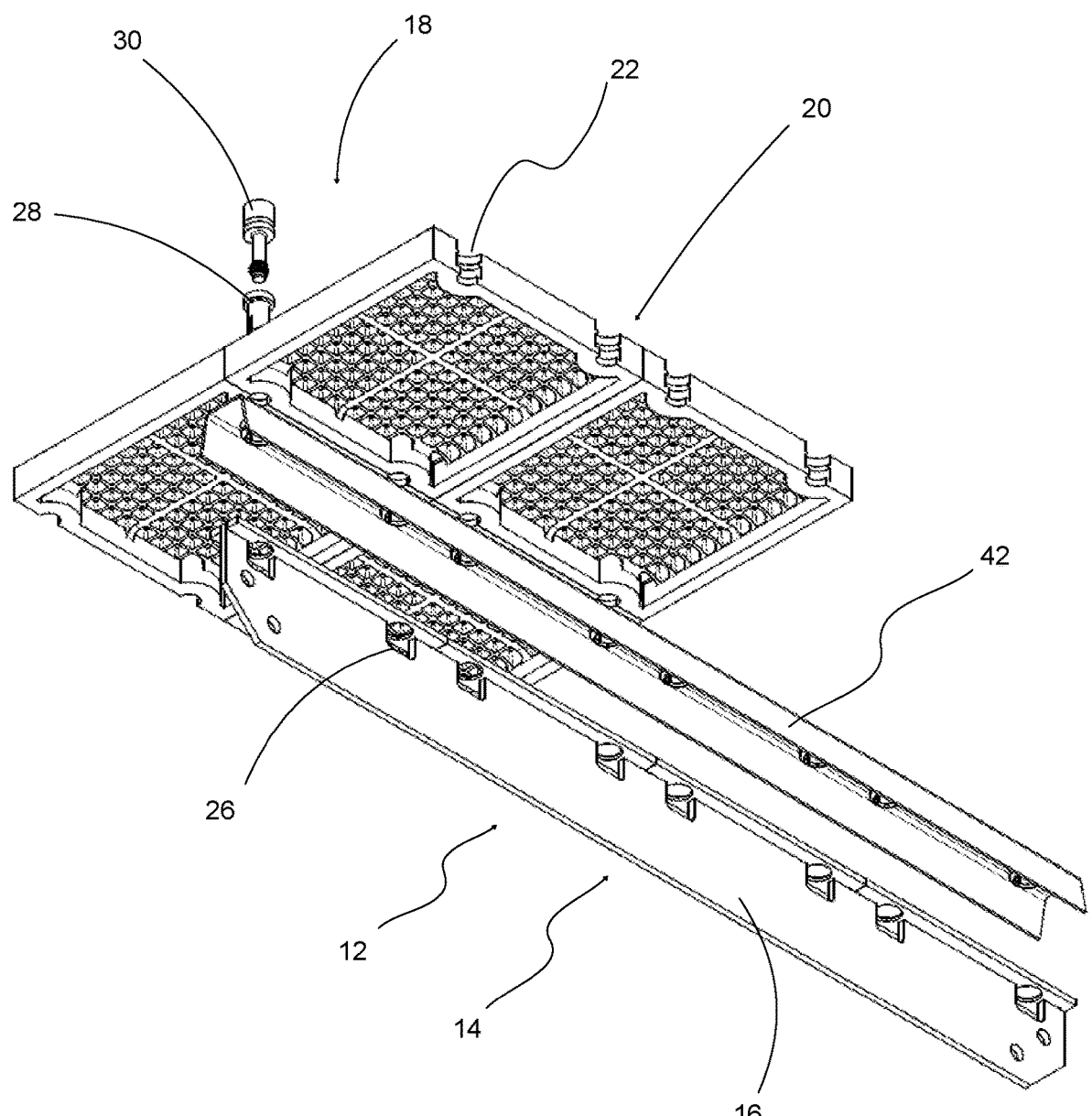
FIG. 2 is an underside exploded parts perspective view illustrating the first example of the screen arrangement.
Figure 3:
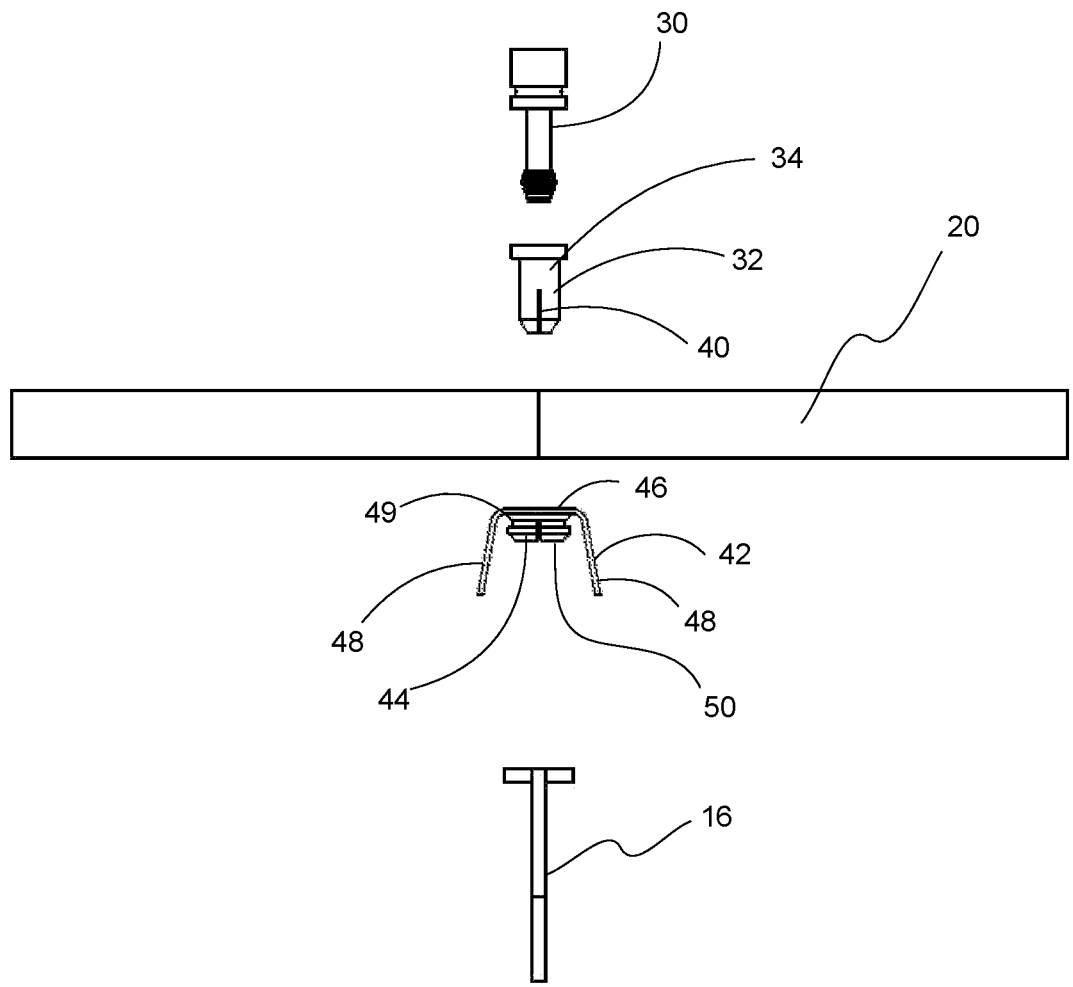
FIG. 3 is a side exploded parts perspective view illustrating the first example of the screen arrangement.

Referring to FIGS. 1 to 3, the screen arrangement 10 includes a frame 12 with a stringer arrangement 14. The stringer arrangement 14 includes one or more stringers 16. The screen arrangement 14 further includes a securing arrangement 18, and a plurality of screen panels 20 adapted to couple to the one or more stringers 16 by the securing arrangement 18.

The plurality of screen panels 20 each include one or more side notches 22 arranged to define a screen aperture 24 between adjacent ones of the plurality of screen panels 20 when fitted together, and the one or more stringers 12 include a stringer aperture 26 aligned with the screen aperture 24 in the fitted or assembled condition as, for example, shown in FIG. 1.

The securing arrangement 18 includes an expandable part 28 adapted to extend from the screen aperture 24 into the stringer aperture 26 and a fastener or pin 30 adapted to pass between the screen aperture 24 and the stringer aperture 26 so as to expand the expandable part 28 within the stringer aperture 26. The fastener 30 is adapted to receive and secure with a ridge or rib 23 defined by the screen aperture 24.

In this example, the expandable part 28 is provided in the form of a removable sleeve 32 having a first section 34 adapted to engage with a ledge 36 of the screen aperture and a second section 38 adapted to be expandable by the fastener 30. The second section 38 includes a split or slot 40 that is resiliently expandable by the fastener 30.

The stringer arrangement 14 may include a stringer cap 42 arranged to extend between the stringer 16 and the adjacent ones of the plurality of screen panels 20. The cap 42 includes cap apertures 44 arranged to align with the stringer apertures 26. The stringer cap 42 includes a middle section 46 arranged to be fitted between the stringer 16 and the adjacent ones of the plurality of screen panels 20, and wings 48 extending from the middle section 46. As best shown in FIG. 3, the wings 48 are flared or angled in a direction away from the adjacent ones of the plurality of screen panels 20 and away from the stringer 16.

Figure 6:
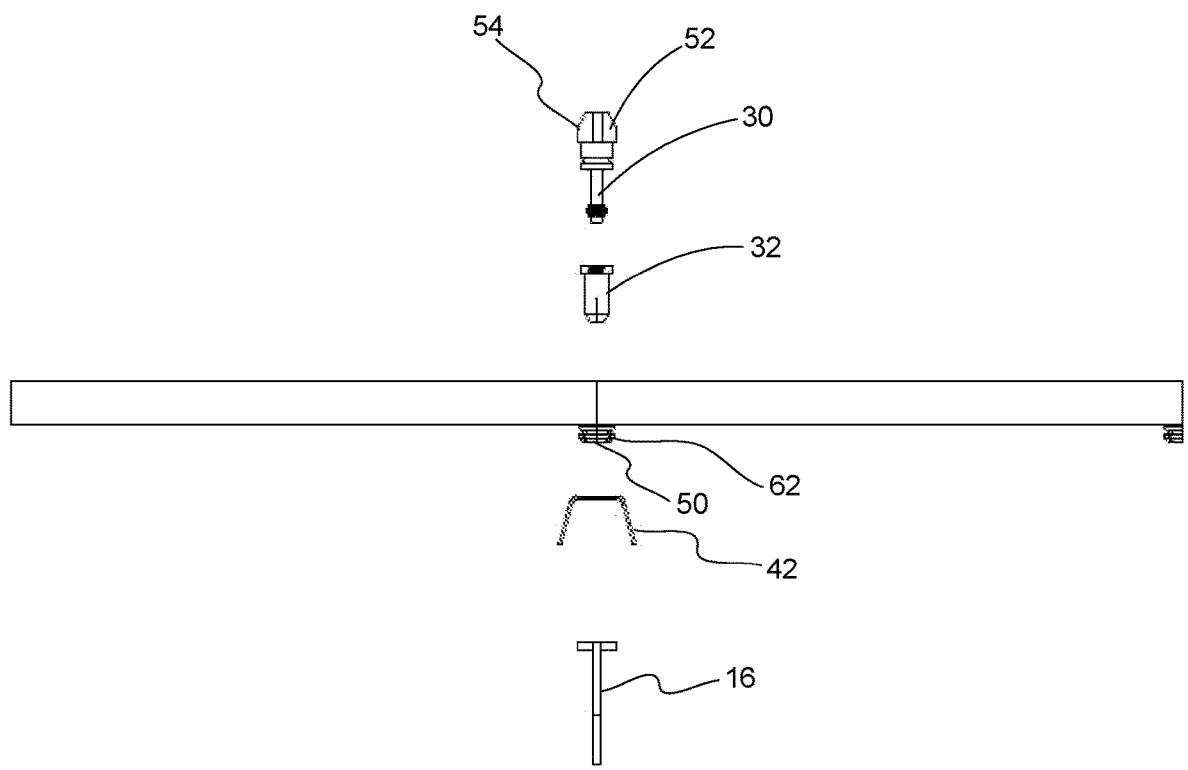
FIG. 6 is a side view illustrating the second example of the screen arrangement.

The securing arrangement 18 may further include a connecting part 49 in the form of a ferrule 50 adapted to be received by and adapted to snap fit with the stringer aperture 26. In this example, the ferrule 50 may be fitted to or be integral with the stringer cap 42. However, the ferrule 50 may also be a separate part fitted to the stringer apertures 26 as shown in FIG. 6 or formed by the panels 20 themselves as is further detailed below and shown in, for example, FIGS. 28 and 29.

Figure 4:
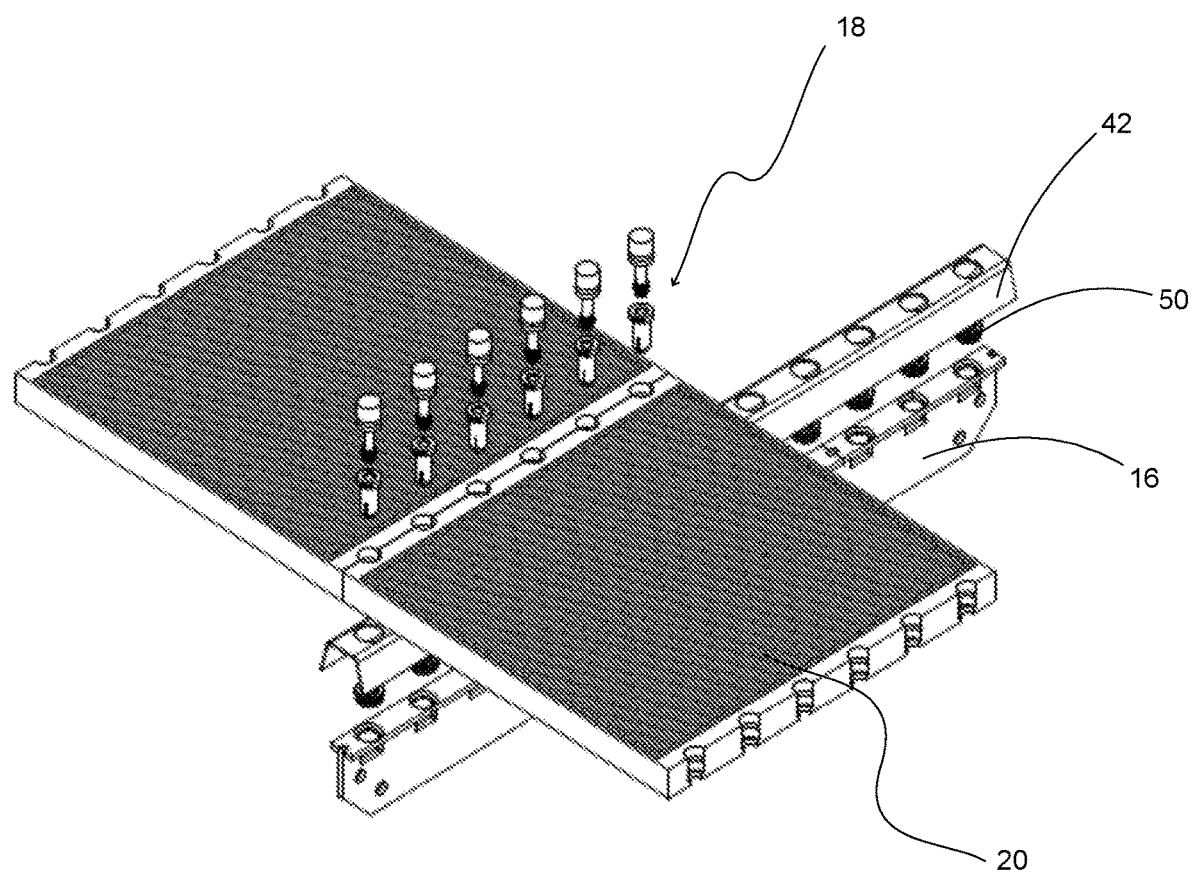
FIG. 4 is a top side exploded parts perspective view illustrating a second example of the screen arrangement.
Figure 5:
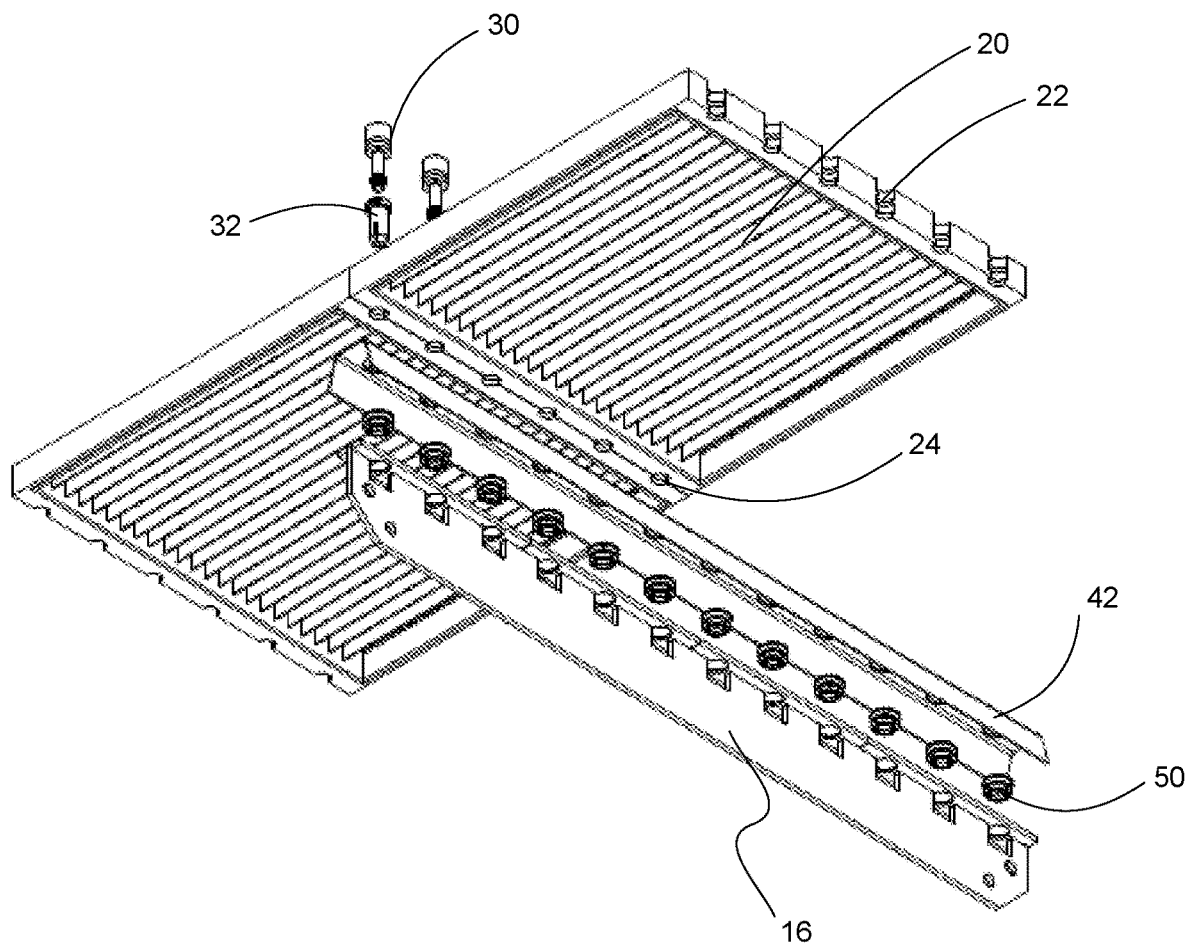
FIG. 5 is an underside exploded parts perspective view illustrating the second example of the screen arrangement.
Figure 7:
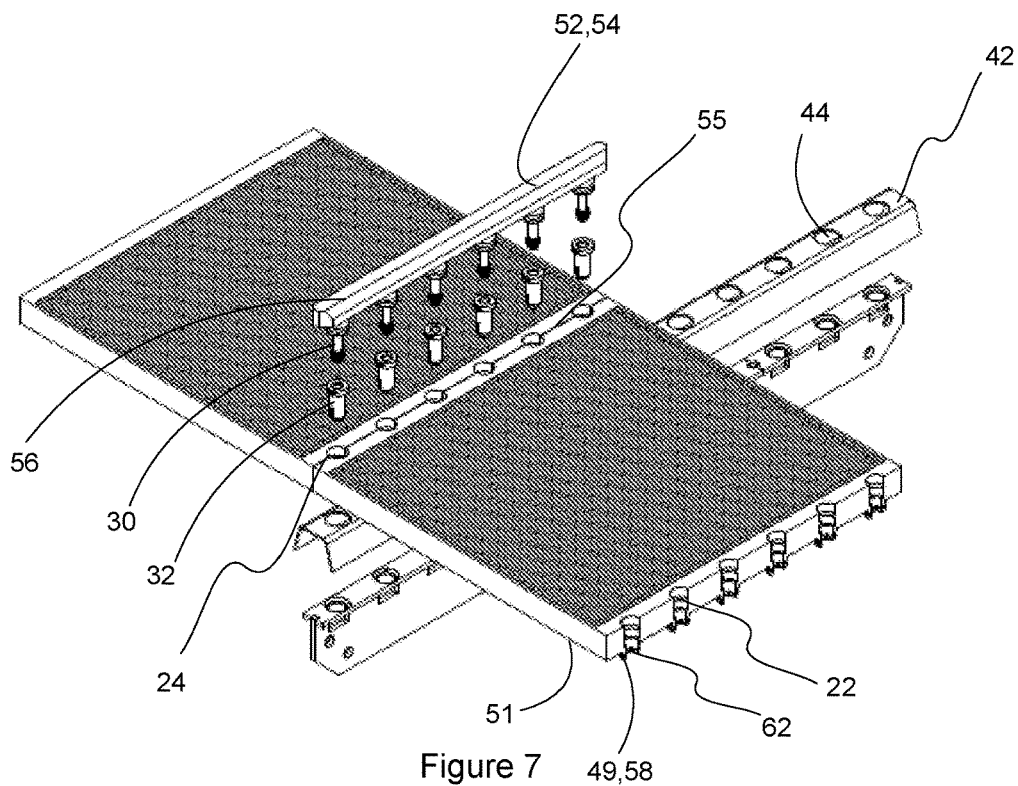
FIG. 7 is a top side exploded parts perspective view illustrating the second example of the screen arrangement.
Figure 8:
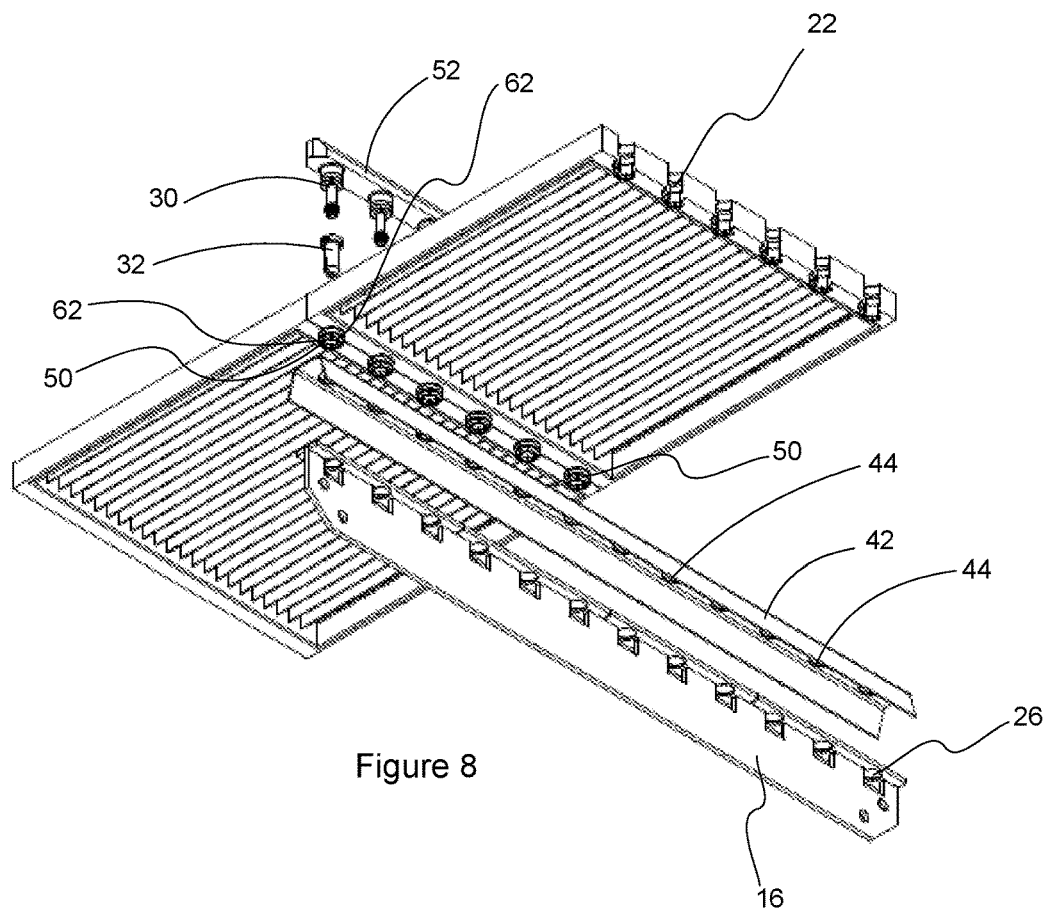
FIG. 8 is an underside exploded parts perspective view illustrating the second example of the screen arrangement.
Figure 9:
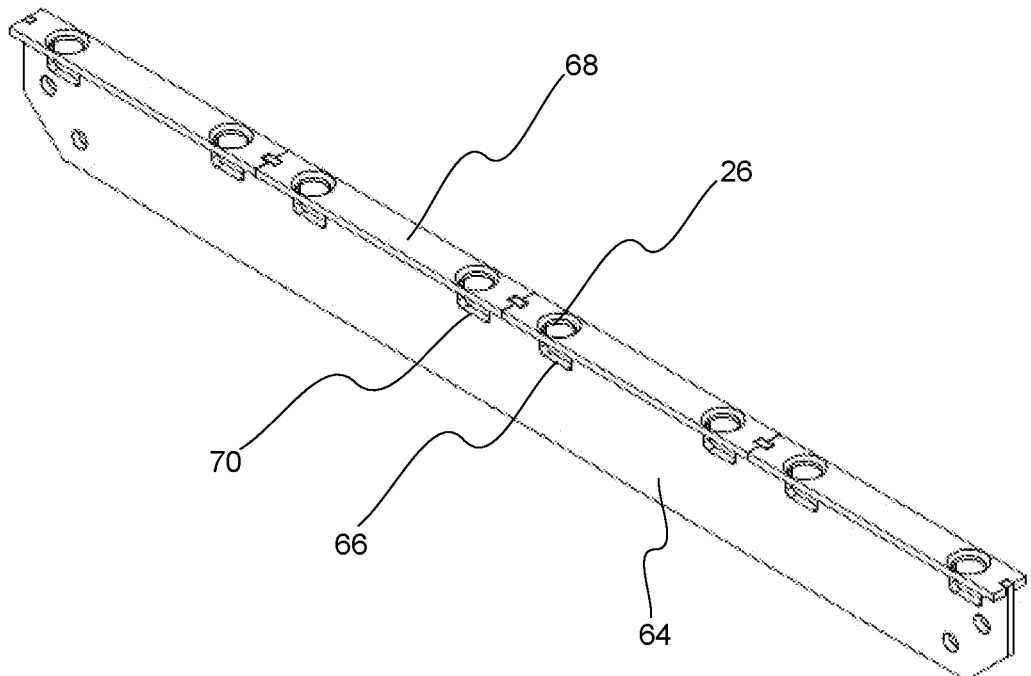
FIG. 9 is a top perspective view illustrating a stringer of the screen arrangement.
Figure 10:
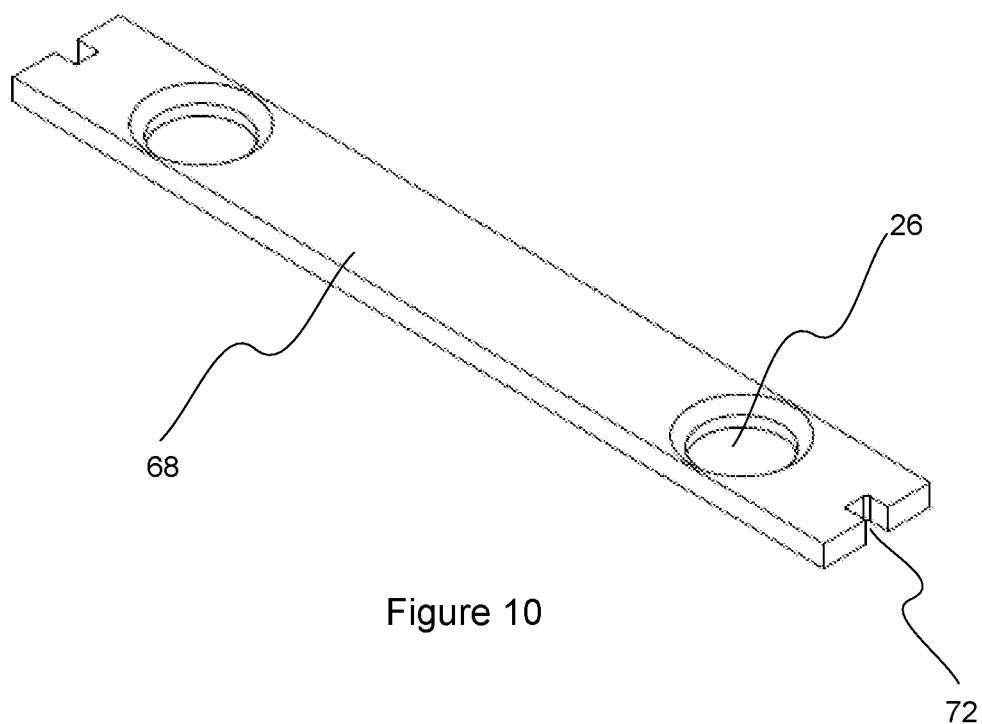
FIG. 10 is a top perspective view illustrating a top support plate of the stringer.
Figure 11:
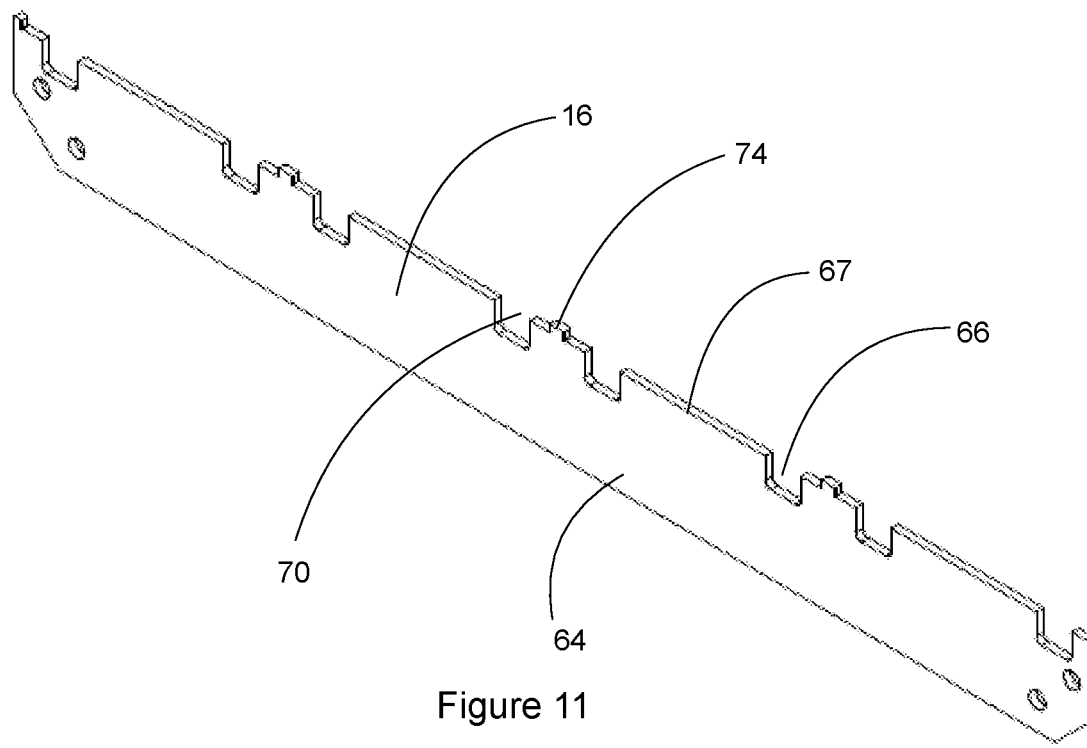
FIG. 11 is a side perspective view illustrating an elongate body plate of the stringer.
Figure 12:
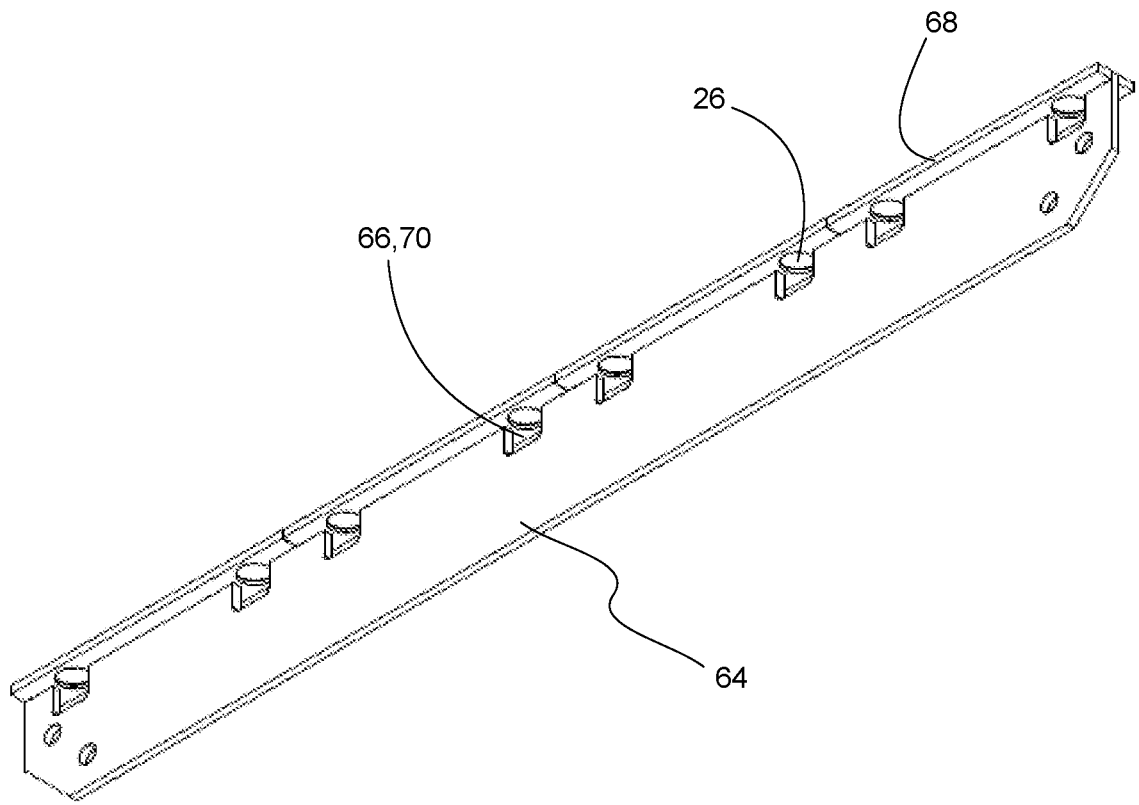
FIG. 12 is an underside perspective view illustrating the stringer.

Referring to FIGS. 4 and 5, there is shown another example of the screen arrangement 10. In this example, the ferrules 50 are fitted to the stringer apertures 26 and the cap 42 may be aligned therewith. FIGS. 6, 7, 8 show yet another example, and in this example, the fasteners 30 are interconnected by an elongate member or coupling bar 52 to form a fastener assembly 36.

The elongate member 52 forms a top cap 54 extending over the junction of the plurality of screen panels 20. The elongate member 52 is outwardly flared or angled to direct material away from a joint 55 between the plurality of screen panels 20. In this example, as best shown in FIG. 7, the notches 22 include projections 58 extending from a bottom face 51 of the panels 20. The projections 58 are semi-circular in shape and form part ferrules 62 that in the fitted condition provide the circular ferrules 50 to fit within the cap apertures 44 and the stringer apertures 26.

Referring now to FIGS. 9, 10, 11 and 12, the stringer arrangement 14 is shown in more detail. The stringers 16 each include an elongate plate body 64 having a series of cut outs 66 along a top side 67 thereof, and one or more perpendicular support plates 68 extending across the cut outs 66. The support plates 68 have the stringer aperture 36 therein. The cut outs 66 are dimensioned or shaped to provide clearance space 70 between the elongate plate body 64 and the stringer aperture 26 for the securing arrangement 18, namely, the sleeve 32 and the fastener 30 that extends into the space 70 in the fitted condition.

The one or more support plates 68 are adapted to locate with one another and include end slots 72 that fit with projections 74 of the elongate plate body 74. The one or more support plates 68 may be machined parts and the apertures 26 may be counter sunk as shown best in FIG. 10. The support plates 68 may be pre-fitted with the ferrules 50.

The stringer 16 may be formed by a method including the steps of: forming a plurality of the cut outs 66 along a side 67 of the elongate plate body 64; forming one or more support plates 68 arranged to be located across the cut outs 66, and forming one or more stringer apertures 26 in the one or more support plates 68 so as to be each associated with one or more of the plurality of cut outs 66; and joining the one or more support plates 68 with the side of the elongate plate body 64 with the one or more support plates 68 being perpendicular to the elongate plate body 64. The stringer 16 and parts thereof may be formed from steel or a similar material, and the one or more support plates 68 may be welded in place as located by the locating projections 74 of plate body 74 and end slots 72 thereof.

Turning now to FIGS. 13*a* to 15, an example of the stringer cap 42 is shown in more detail. This example includes an integral ferrule 50 that is shaped to snap fit through the stringer apertures 26. The stringer cap 42 may be moulded from a plastic material, with the ferrule 50 having some resilience for snap fitting.

FIGS. 16 to 19 show an example of the ferrule 50 when provided as a separate part. The ferrule 50 has a cylindrical body 76 having an aperture 77 with a flat top surface 78 and top rim 79, a chamfered bottom rim 80 and an annular recess 82 therebetween. Slots 84 extend from the chamfered bottom rim 80 to allow resistant compression when the ferrule 50 is fitted to the stringer aperture 26 with the stringer aperture 26 being captured in the annular recess 82. As aforesaid, the ferrule 50 functions as a connecting part 49 and may be formed or provided as a stand-alone part, fitted to the cap 42 or formed by the panels 20.

Figure 20:
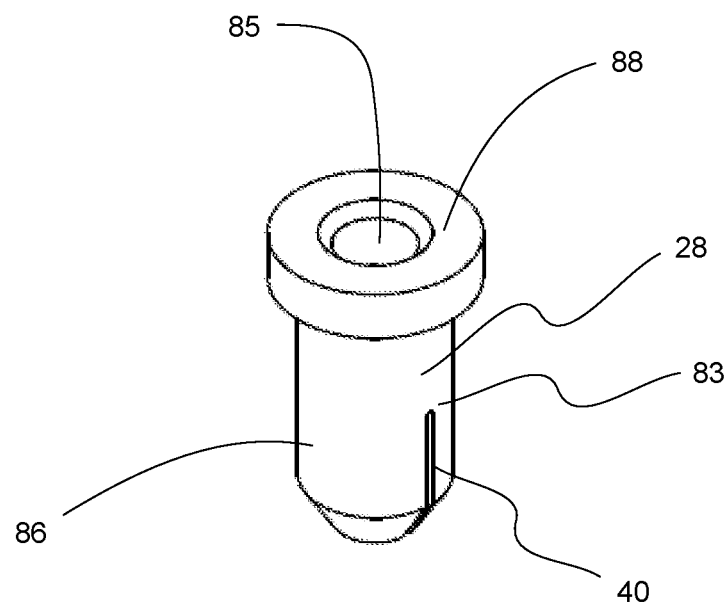
FIG. 20 is a perspective view illustrating a sleeve of a securing arrangement.
Figures 21, 22:
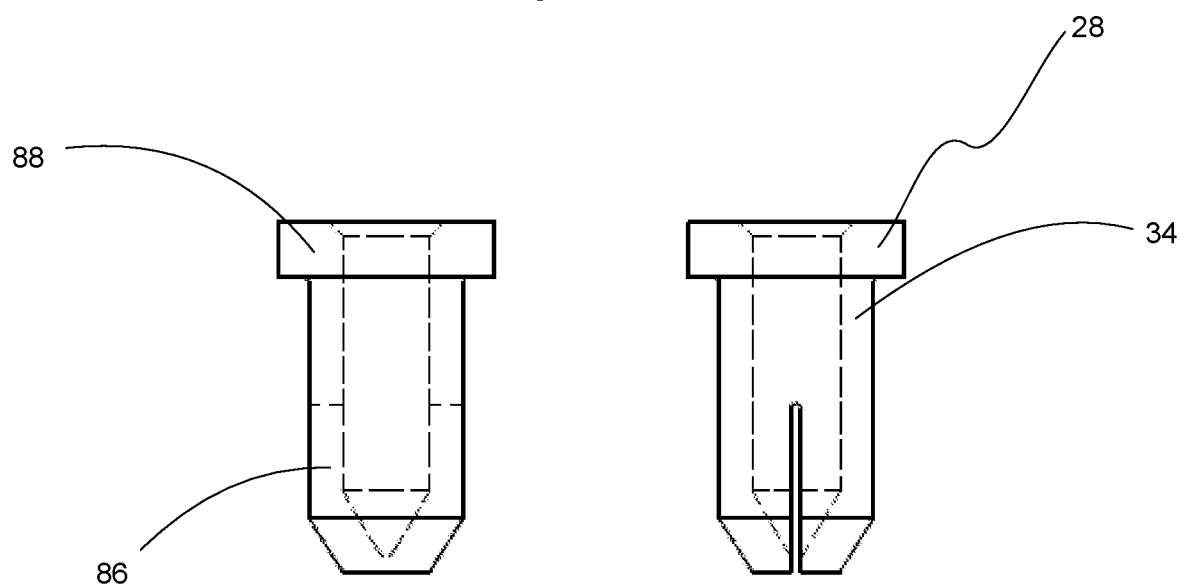
FIG. 21 is a first side perspective view illustrating the sleeve of a securing arrangement.
FIG. 22 is a second side perspective view illustrating the sleeve of a securing arrangement.

Referring to FIGS. 20 to 22, the sleeve 32 is shown in more detail. The sleeve 32 includes a generally cylindrical body 83 that includes an aperture 85 into which the fastener 30 is fitted in use. The cylindrical body 83 include a shank 86 and a head 88. The shank 86 including the second section 38 with the expandable part 28, and the head 88 including the first section 34 to seat on the ledge 36, in use. The split or slot 40 is pried open by the press fit of the fastener 30 to secure the arrangement of the sleeve 32, fastener 30, ferrule 50 together, and thereby securing the panel arrangement 20 to the stringers 16.

Figure 23:
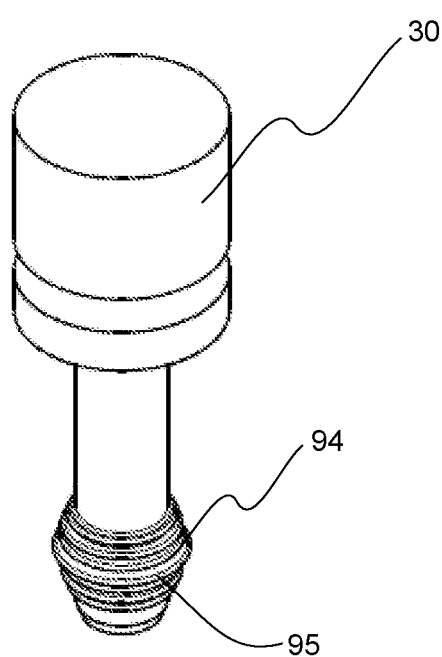
FIG. 23 is a top perspective view illustrating a fastener or pin of the securing arrangement.
Figure 24:
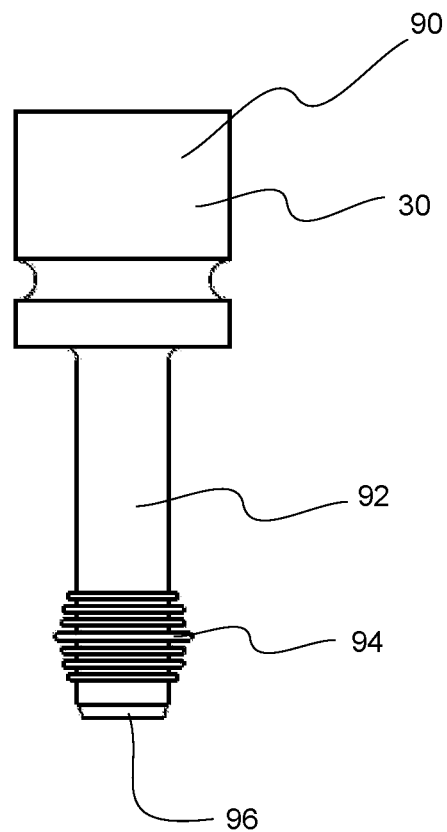
FIG. 24 is a side view illustrating the fastener of the securing arrangement.
Figure 25:
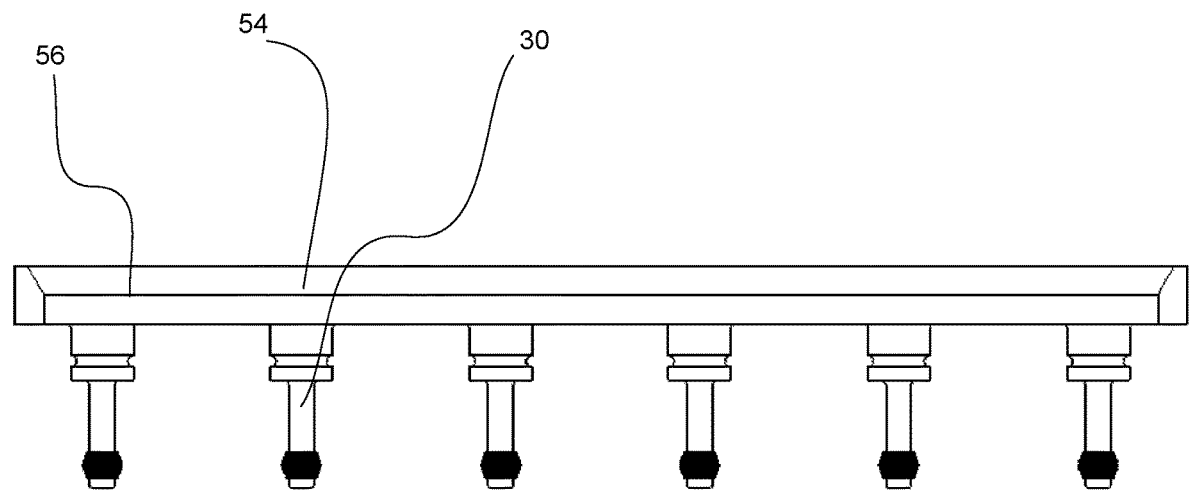
FIG. 25 is a side view illustrating a coupling bar of another example of the securing arrangement.
Figure 26:
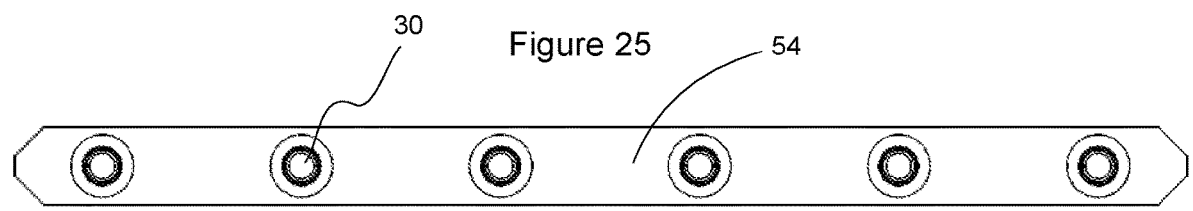
FIG. 26 is a bottom view illustrating the coupling bar.
Figure 27:
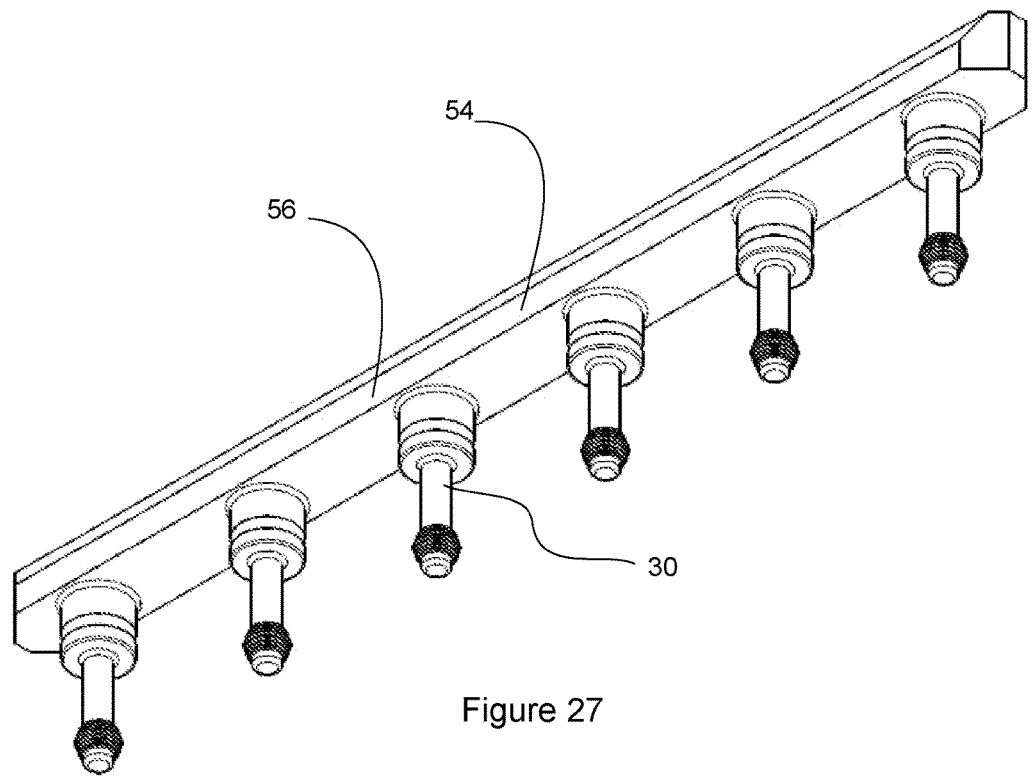
FIG. 27 is an underside perspective view illustrating the coupling bar.
Figure 28:
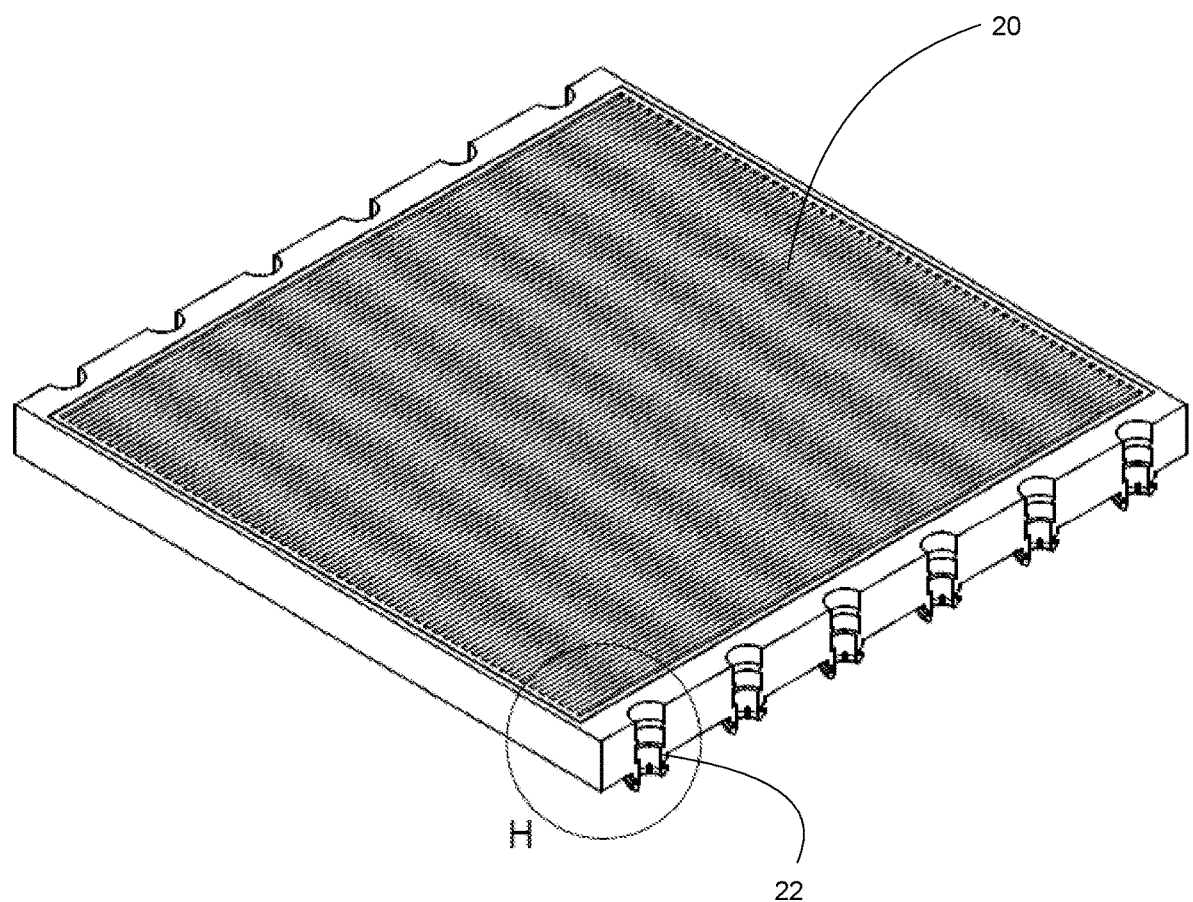
FIG. 28 is a top perspective view illustrating an example of a panel.
Figure 29:
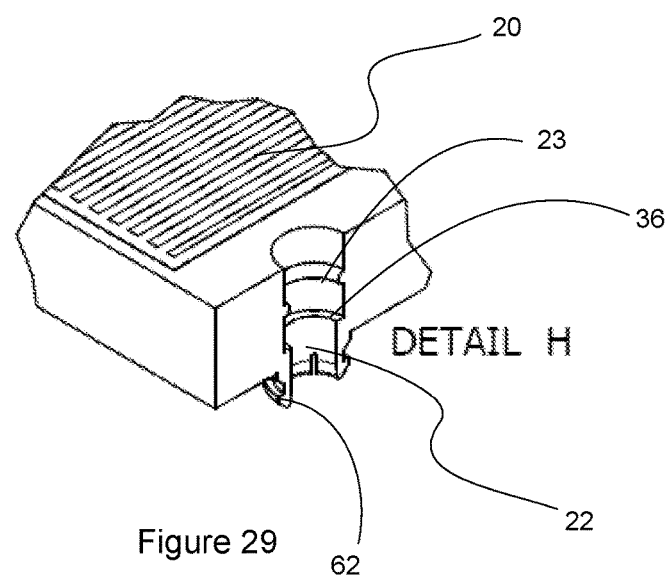
FIG. 29 is a detailed view illustrating an aperture of the panel.
Figure 30:
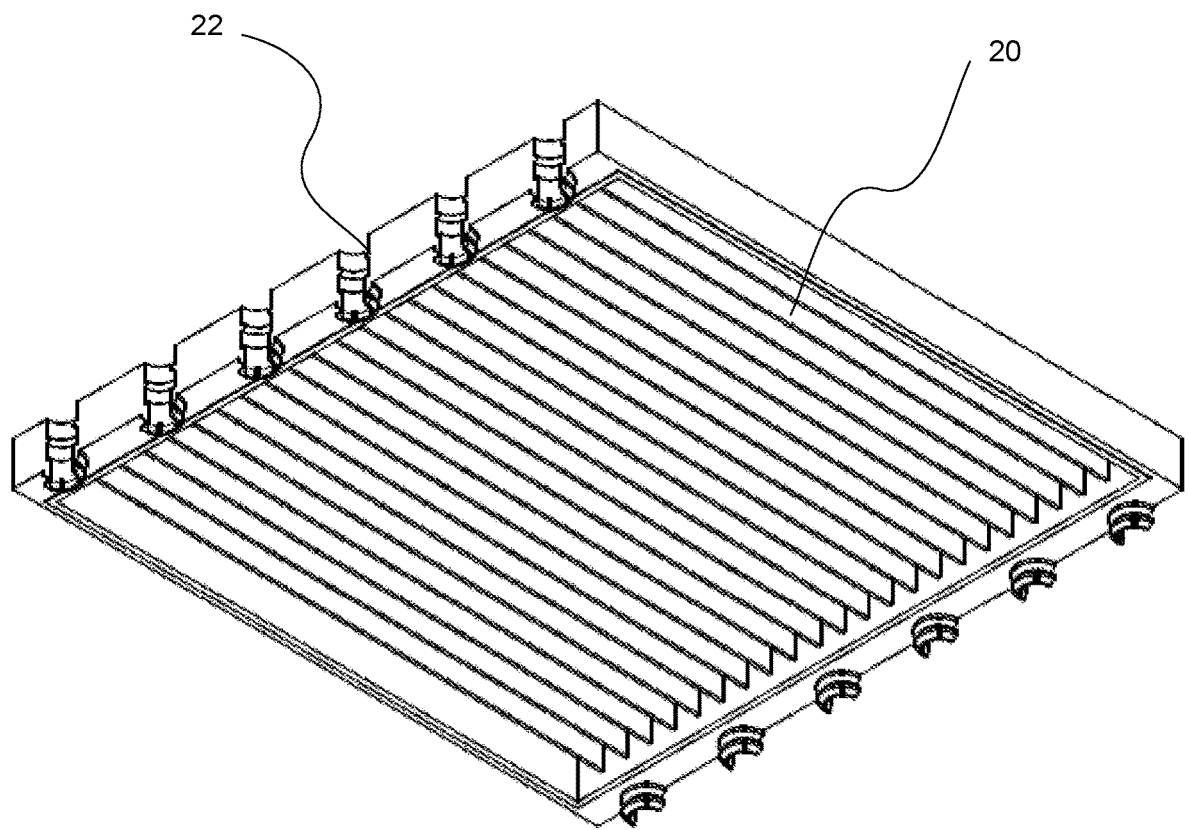
FIG. 30 is an underside perspective view illustrating yet another example of the panel.
Figure 31:
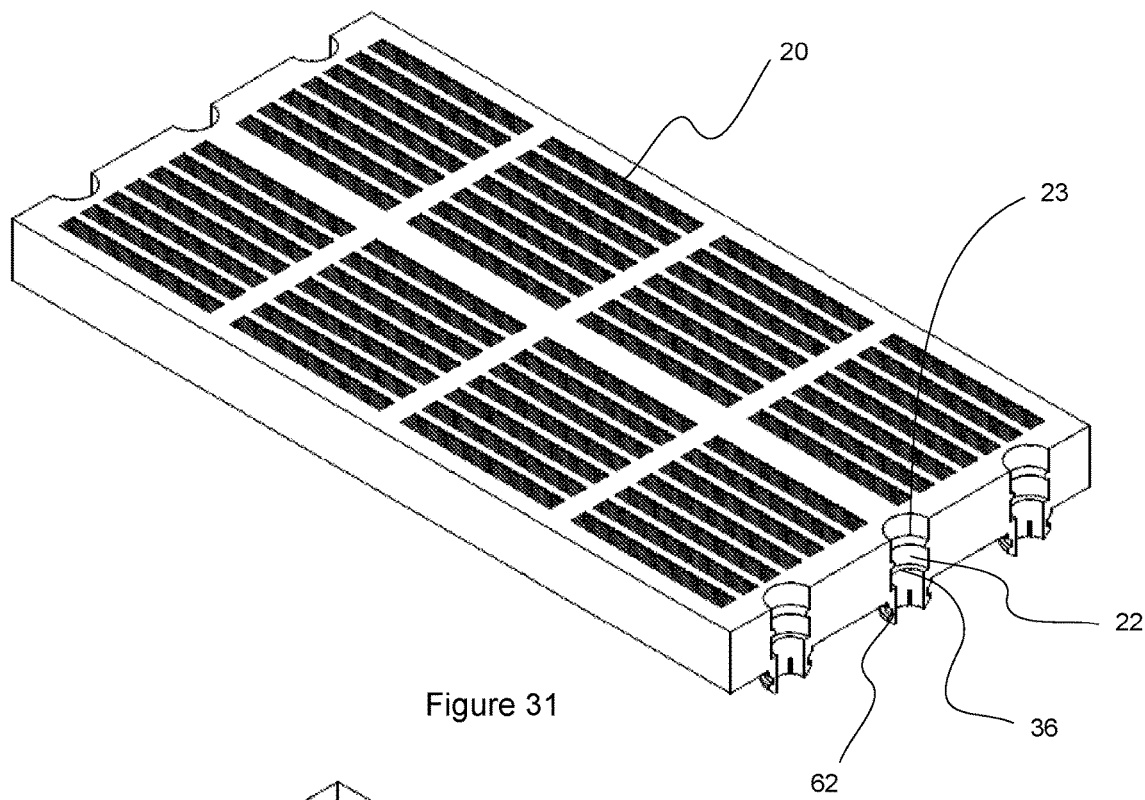
FIG. 31 is a topside perspective view illustrating yet another example of the panel.
Figure 32:
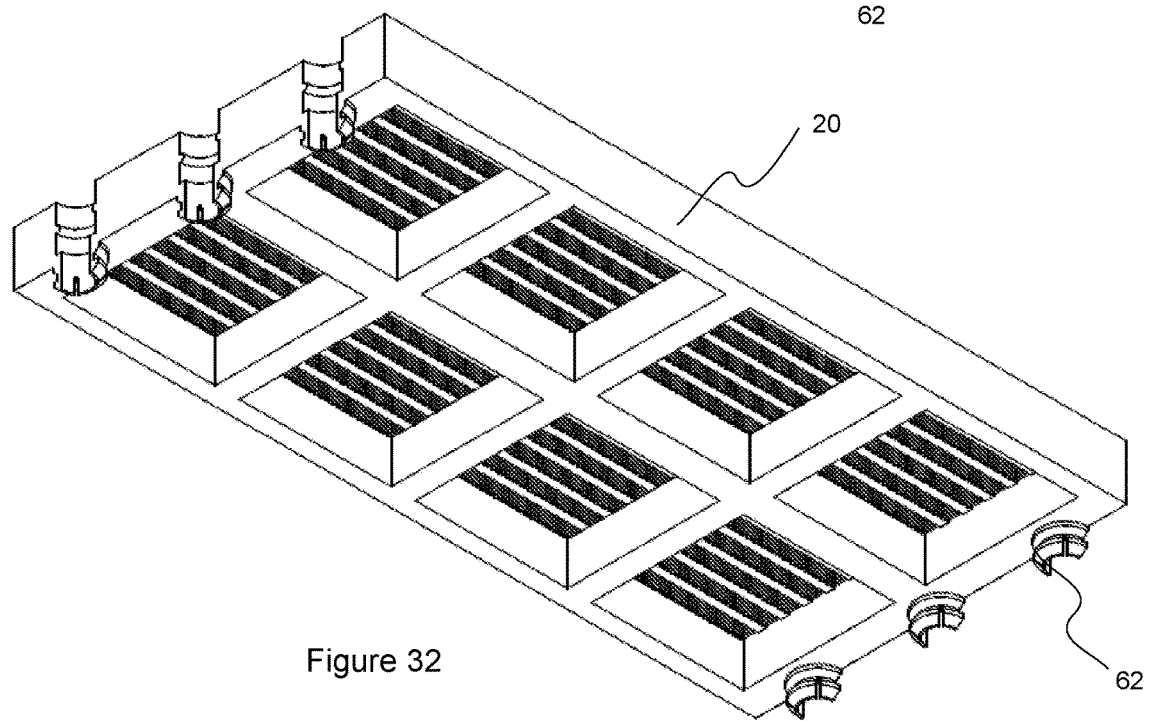
FIG. 32 is an underside perspective view illustrating the panel.

Referring to FIGS. 23 to 24, the fastener 30 includes a head 90 adapted to be captured within the screen aperture 24 and a stem 92 extending from the head 90. The stem 92 including a bulbous expander section 94 with resilient ridges 95 toward its free end 96 adapted to engage with the sleeve 32 to expand the sleeve 32 in the fitted condition. The head 90 includes an annular recess 95 that receives the ridge 23 of the screen aperture 24 to secure the fastener 30 within the screen aperture 24. As shown in FIGS. 25 to 27, the fastener 30 may also be provided as the fastener assembly 56 in which a plurality of the fasteners 30 are carried by the top cap 54.

Figure 33B:
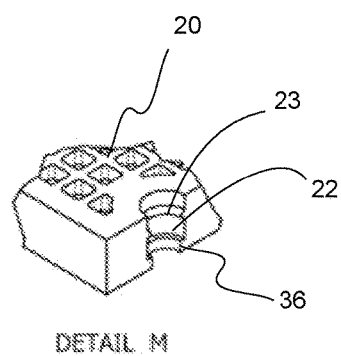
Figure 33A:
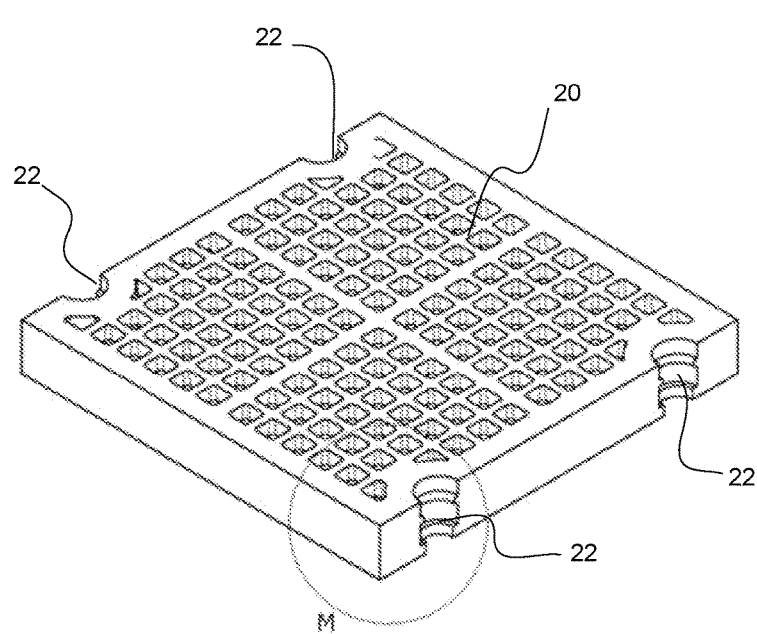
FIG. 33a is a topside perspective view illustrating yet another example of the panel.
Figure 33C:
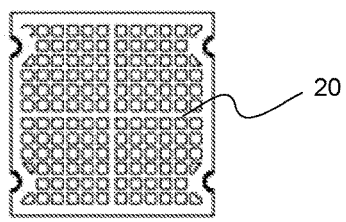

Referring to FIGS. 28 to 32 shown further examples of the panel 20 in which the side notches 22 include the rib 23 and the ledge 36 as well as the projection 58 to provide the part ferrule 62. FIGS. 33*a* to 33*c* show yet another example of the panel 20 which include the rib 23 and the ledge 36, without the part ferrules 62. Other variations in shape, size and configuration are possible. The panels 20 may be formed from a material including a plastics i.e. polypropylene, or metals.

In use, the screen arrangement 10 may be formed by a method including firstly assembling the frame 12 with the stringer arrangement 14 having a series of spaced apart stringers 16. In some examples, the ferrules 50 may be fitted to the stringer apertures 26 and in other examples the ferrules 50 are carried by the cap 42 or formed by the panels 20 themselves. The cap 42 may be optionally fitted along the stringers 16 with the cap apertures 44 aligned with the stringer apertures 26.

At least two of the plurality of screen panels 20 may then be fitted adjacent one another such that side notches 22 thereof define the screen apertures 24 aligned with the stringer aperture 26. The sleeve 32 is then fitted into the screen aperture 24 and locates with the ledge 36. Finally, the fastener or pin 30 is fitted into the sleeve 32 with the head 90 snap fitting with the ridge 23 and the bulbous expander section 94 opening the expandable part 28 of the sleeve 32 within the stringer aperture 26 thereby coupling the at least two of the plurality of screen panels 20 and the stringer 16. It is noted the above method may be generally toolless and involves snap fitting of parts which is rapid, simple and robust.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any known matter or any prior publication is not, and should not be taken to be, an acknowledgment or admission or suggestion that the known matter or prior art publication forms part of the common general knowledge in the field to which this specification relates.

While specific examples of the invention have been described, it will be understood that the invention extends to alternative combinations of the features disclosed or evident from the disclosure provided herein.

Many and various modifications will be apparent to those skilled in the art without departing from the scope of the invention disclosed or evident from the disclosure provided herein.

The invention claimed is:

1. A screen arrangement including a stringer, a securing arrangement, and a plurality of screen panels adapted to couple to the stringer by the securing arrangement, wherein the plurality of screen panels each include a side notch arranged to define a screen aperture between adjacent ones of the plurality of screen panels and the stringer includes a stringer aperture fitted with a ferrule alignable with the screen aperture, wherein the securing arrangement includes an expandable part adapted to extend from the screen aperture into the ferrule and a fastener adapted pass between the screen aperture and the ferrule so as to expand the expandable part within the ferrule, wherein the stringer aperture is counter sunk and the ferrule includes a chamfered bottom rim to allow resilient compression thereof to resiliently snap fit through the stringer aperture so as to be secured thereto.

2. The screen arrangement according to claim 1, wherein the expandable part is provided in the form of a sleeve having a first section adapted to engage with a ledge of the screen aperture and a second section adapted to be expandable by the fastener.

3. The screen arrangement according to claim 2, wherein the sleeve is removeable.

4. The screen arrangement according to claim 1, wherein the screen arrangement further includes a stringer cap extending between the stringer and the adjacent ones of the plurality of screen panels.

5. The screen arrangement according to claim 4, wherein the stringer cap includes a middle section arranged to be fitted between the stringer and the adjacent ones of the plurality of screen panels, and wings.

6. The screen arrangement according to claim 5, wherein the wings are flared in a direction away from the adjacent ones of the plurality of screen panels.

7. The screen arrangement according to claim 6, wherein the stringer cap includes a cap aperture arranged to align with the stringer aperture.

8. The screen arrangement according to claim 4, wherein the stringer cap receives the ferrule.

9. The screen arrangement according to claim 1, wherein the fastener includes a head adapted to be captured within the ferrule and a stem extending from the head, the stem including an expander section adapted to engage with the expandable part.

10. The screen arrangement according to claim 1, wherein the stringer includes an elongate plate body having a cut out therein and a perpendicular support plate extending across the cut out, the support plate having the stringer aperture therein.

11. The screen arrangement according to claim 10, wherein the cut out is shaped to provide clearance between the elongate plate body and the stringer aperture.

12. The screen arrangement according to claim 10, wherein the perpendicular support plate includes a plurality of sections each including one or more of the stringer apertures.

13. The screen arrangement according to claim 1, wherein each of the plurality of screen panels includes a plurality of notches that form a corresponding plurality of the screen apertures, and wherein the stringer includes a plurality of stringer apertures.

14. A method of securing a plurality of screen panels to a stringer using a securing arrangement, the method including:
providing a stringer having a stringer aperture that is counter sunk;
resiliently snap fitting a ferrule through the stringer aperture so as to be secured thereto, the ferrule having a chamfered bottom rim to allow resilient compression thereof when fitted through the stringer aperture;
fitting at least two of the plurality of screen panels adjacent one another such that notches at sides thereof define a screen aperture aligned with the ferrule;
fitting a fastener through the screen aperture and the ferrule so as to expand an expandable part that extends from the screen aperture into the stringer aperture thereby coupling the at least two of the plurality of screen panels and the stringer.

15. A stringer arrangement for a screen arrangement, the stringer arrangement including a stringer having an elongate plate body with a plurality of cut outs along a side thereof and one or more support plates arranged perpendicularly to the elongate plate body and along the side to as to extend across the cut outs, wherein the one or more support plates each include one or more stringer apertures each associated with one or more of the plurality of cut outs, wherein the stringer aperture is counter sunk and is fitted with a ferrule including a chamfered bottom rim to allow resilient compression thereof to resiliently snap fit through the stringer aperture so as to be secured thereto.

16. A method of forming a stringer for a screen arrangement, the method including: forming a plurality of cut outs along a side of an elongate plate body; forming one or more support plates arranged to be located across the cut outs, and forming one or more stringer apertures in the one or more support plates so as to be each associated with one or more of the plurality of cut outs, each of the one or more stringer apertures being counter sunk; joining the one or more support plates with the side of an elongate plate body with the one or more support plates being perpendicular to the elongate plate body; and resiliently snap fitting a ferrule with a chamfered bottom rim to allow resilient compression thereof through the stringer aperture so as to be secured thereto.

17. The screen arrangement according to claim 1, wherein the ferrule includes an annular recess in which the stringer is captured.

18. The screen arrangement according to claim 1, wherein the ferrule includes a cylindrical body having an aperture to receive the securing arrangement, a top rim fitted adjacent a top surface of the stringer, and an annular recess between the top rim and the bottom rim.

19. The screen arrangement according to claim 18, wherein the ferrule includes slots extending from the chamfered bottom rim to allow resilient compression when the ferrule is fitted to the stringer aperture with the stringer aperture being captured by the annular recess.

* * * * *